United States Patent
Lu et al.

(10) Patent No.: US 10,651,767 B2
(45) Date of Patent: *May 12, 2020

(54) METHODS AND APPARATUS FOR THREE-PHASE MOTOR CONTROL WITH ERROR COMPENSATION

(71) Applicant: Allegro MicroSystems, LLC, Manchester, NH (US)

(72) Inventors: Yisong Lu, Shrewsbury, MA (US); Christopher Alger, Holden, MA (US); Lyndon Ambruson, Warren, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,292

(22) Filed: May 1, 2019

(65) Prior Publication Data

US 2019/0260315 A1    Aug. 22, 2019

Related U.S. Application Data

(63) Continuation of application No. 15/467,075, filed on Mar. 23, 2017, now Pat. No. 10,326,389.

(51) Int. Cl.
*H02P 6/16* (2016.01)
*H02P 27/08* (2006.01)
*H02P 21/10* (2016.01)

(52) U.S. Cl.
CPC .............. *H02P 6/16* (2013.01); *H02P 21/10* (2013.01); *H02P 27/08* (2013.01)

(58) Field of Classification Search
CPC ..... H02P 29/0094; H02P 8/38; H02P 29/0066
See application file for complete search history.

(56) References Cited

U.S. PATENT DOCUMENTS

| | | | |
|---|---|---|---|
| 6,826,499 B2 | 11/2004 | Colosky et al. | |
| 7,746,023 B2 | 6/2010 | Ajima et al. | |
| 8,278,853 B2 * | 10/2012 | Kitagawa | H02P 6/15 318/400.13 |
| 8,836,326 B2 | 9/2014 | Maeda et al. | |
| 10,063,178 B2 * | 8/2018 | Lee | H02P 6/16 |
| 2012/0158341 A1 | 6/2012 | Ueda et al. | |
| 2012/0242264 A1 | 9/2012 | Satake et al. | |
| 2013/0099708 A1 | 4/2013 | Shimizu et al. | |
| 2016/0109531 A1 | 4/2016 | Kim et al. | |
| 2018/0278185 A1 | 9/2018 | Lu et al. | |

FOREIGN PATENT DOCUMENTS

GB    2515087 A    12/2014
TW    201539969 A    10/2015

OTHER PUBLICATIONS

U.S. Appl. No. 15/184,159, filed Jun. 16, 2016, Lu et al.
(Continued)

*Primary Examiner* — Bickey Dhakal
(74) *Attorney, Agent, or Firm* — Daly Crowley Mofford & Durkee, LLP

(57) ABSTRACT

Method and apparatus for providing error compensation for a magnetic field sensing element in a three-phase motor. In embodiments, a driving angle is determined from zero-crossings of the magnet pole-pairs and error compensation levels for the pole-pairs is determined to reduce distortions in the motor current waveform.

24 Claims, 7 Drawing Sheets

(56) References Cited

OTHER PUBLICATIONS

U.S. Appl. No. 15/149,448, filed May 8, 2016, Lu.
U.S. Appl. No. 15/216,891, filed Jul. 22, 2016, Lu.
U.S. Appl. No. 15/184,163, filed Jun. 16, 2016, Lu et al.
U.S. Appl. No. 15/374,154, filed Dec. 9,2 016, Lu et al.
Alaeinovin et al., "Evaluating Misalignment of Hall Sensors in Brushless DC Motors;" IEEE Electrical Power & Energy Conference; Oct. 6, 2008; 6 Pages.
PCT International Search Report and Written Opinion dated May 9, 2018 for International Application No. PCT/US2018/019875; 15 Pages.
Taiwan Office Action (with English Translation) dated Nov. 2, 2018 for Taiwan Application No. 107107860; 17 Pages.
Response (with English Translation and Amended Claims) to Taiwan Office Action dated Nov. 2, 2018 for Taiwan Application No. 107107860; Response filed Dec. 19, 2018; 27 Pages.
Taiwan Second Office Action (with English Translation) dated Feb. 13, 2019 for Taiwan Application No. 107107860; 19 Pages.
U.S. Non-Final Office Action dated Jul. 25, 2018 for U.S. Appl. No. 15/467,075; 21 Pages.
Response to U.S. Non-Final Office Action dated Jul. 25, 2018 for U.S. Appl. No. 15/467,075; Response filed Oct. 24, 2018; 14 Pages.
U.S. Notice of Allowance dated Feb. 27, 2019 for U.S. Appl. No. 15/467,075; 14 Pages.
Response (with English Translation) to Taiwan Office Action dated Feb. 13, 2019 for Taiwan Application No. 107107860; Response filed May 9, 2019; 12 Pages.
Taiwan Allowance Decision (with English Translation) dated Oct. 2, 2019 for Taiwan Application No. 107107860; 3 Pages.
PCT International Preliminary Report dated Oct. 3, 2019 for International Application No. PCT/US2018/019875; 8 Pages.

* cited by examiner

| Pole Pairs | Zero Cross Angle | Ref Angle | Hall Error | HEC Value |
|---|---|---|---|---|
| 1 | 0 | 1 | -1 | 2 |
| 2 | 3 | 1 | 2 | -4 |
| 3 | -2 | 1 | -3 | 6 |
| 4 | 5 | 1 | 4 | -8 |
| 5 | -1 | 1 | -2 | 4 |
*FIG. 7*
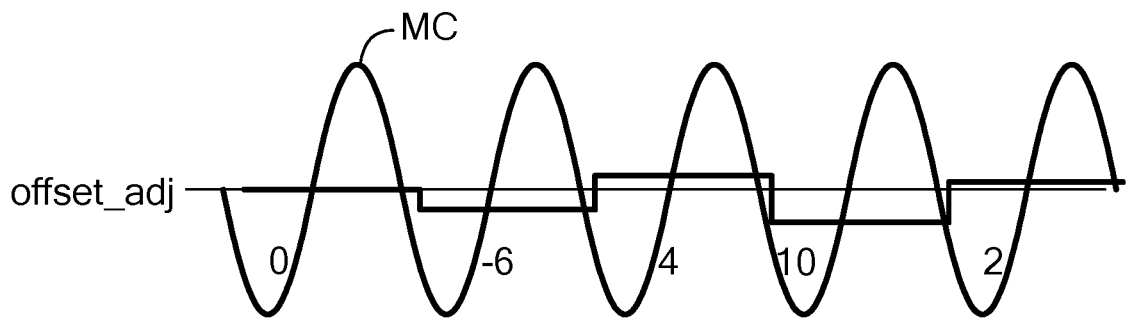
*FIG. 7A*
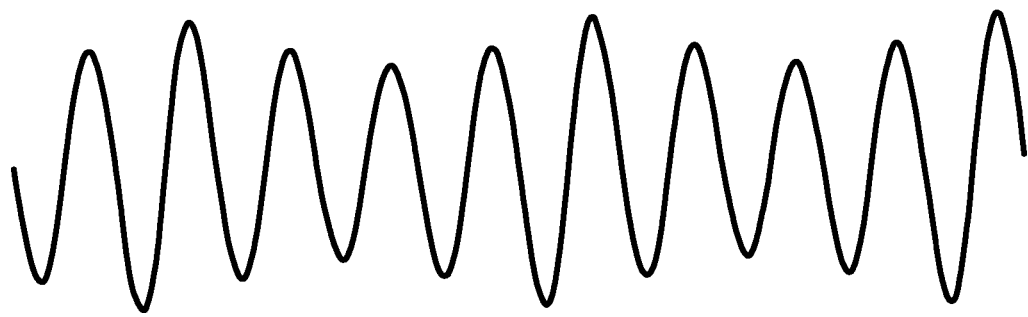
*FIG. 7B*
PRIOR ART

METHODS AND APPARATUS FOR THREE-PHASE MOTOR CONTROL WITH ERROR COMPENSATION

CROSS REFERENCE TO RELATED APPLICATIONS

This application is a continuation application of U.S. patent application Ser. No. 15/467,075 filed on Mar. 23, 2017, and entitled "METHODS AND APPARATUS FOR THREE-PHASE MOTOR CONTROL WITH ERROR COMPENSATION," which application is hereby incorporated herein by reference in its entirety.

BACKGROUND

In motor control applications, magnetic field sensing elements, such as Hall sensors, are commonly used to sense the magnetic field of the motor and provide motor position feedback. Due to limitations of motor production processing, Hall sensors may not be installed in a precise position. In addition, a magnetic field may not be perfectly symmetric from pole to pole and the motor windings may not perfectly symmetric between the phases. These and other cumulative errors may cause inaccurate control, e.g., phase commutation, to the motor, which may distort the motor current, reduce motor efficiency, and add to operational acoustic noise. Such errors may also lower product consistency during production because the cumulative error may vary from motor to motor.

SUMMARY

The present invention provides method and apparatus for motor control systems for three-phase motors having magnetic field sensing element error compensation in accordance with illustrative embodiments of the invention. In embodiments, the system may include a Hall sensor to detect motor position. By providing error compensation for the magnetic field sensing element, such as the Hall element, the motor can be controlled so as to operate more efficiently, quietly, and smoothly than in conventional motor control systems. Embodiments of the invention may be well suited for BLDC (brushless DC) motor operation for stabilizing the motor current and reducing distortions away from a sinusoidal waveform.

In one aspect of the invention, a method comprises: operating a three-phase motor having a magnet with a number of pole-pairs and detecting zero crossings from a magnetic field sensing element proximate the magnet, wherein the zero crossings correspond to pole transitions for of the pore-pairs; determining drive angles corresponding to each of the zero crossings; determining a reference angle from the drive angles; sequentially positioning the motor to correspond to each one of the pole transitions and setting a drive angle to the reference angle; examining a signal generated from the magnetic field sensing element for each of the pole transitions; adjusting a compensation level for the magnetic field sensing element for each of the pole transitions based on the signal generated from the magnetic field sensing element for the respective pole transitions; and operating the motor and applying the compensation level for each of the pole transitions as the corresponding pole transition is proximate the magnetic field sensing element.

The method can further include one or more of the following features: providing the magnetic field sensing element as a Hall element, examining the signal from the magnetic field sensing element using a three state comparator, the magnetic field sensing element comprises a Hall element, the compensation level for each of the pole transitions corresponds to an error in positioning of the magnetic field sensing element, rotating the motor in clockwise and counterclockwise directions to reduce hysteresis error, the zero crossings correspond to S to N pole transitions, taking an average of the driving angles to determine the reference angle, using coarse and fine searching to determine the reference angle, and/or storing for each pole-pair transition a zero crossing angle, a reference angle, an error value, and a compensation value.

In a further aspect of the invention, a system comprises a motor controller for a three phase motor comprising: a means for error compensation to operate a three-phase motor having a magnet with a number of pole-pairs and detecting zero crossings from a magnetic field sensing element proximate the magnet, wherein the zero crossings correspond to pole transitions for of the pole-pairs, to determine drive angles corresponding to each of the zero crossings, to determine a reference angle from the drive angles, to sequentially position the motor to correspond to each one of the pole transitions and setting a drive angle to the reference angle, to examining a signal generated from the magnetic field sensing element for each of the pole transitions; to adjust a compensation level for the magnetic field sensing element for each of the pole transitions based on the signal generated from the magnetic field sensing element for the respective pole transitions; and to operate the motor and applying the compensation level for each of the pole transitions as the corresponding pole transition is proximate the magnetic field sensing element.

The system can be further configured to include one or more of the following features: the magnetic field sensing element comprises a Hall element, examine the signal from the magnetic field sensing element using a three state comparator, the magnetic field sensing element comprises a Hall element, the compensation level for each of the pole transitions corresponds to an error in positioning of the magnetic field sensing element, rotate the motor in clockwise and counterclockwise directions to reduce hysteresis error, the zero crossings correspond to S to N pole transitions, take an average of the driving angles to determine the reference angle, use coarse and fine searching to determine the reference angle, and/or store for each pole-pair transition a zero crossing angle, a reference angle, an error value, and a compensation value.

In a further aspect of the invention, an article comprises: a non-transitory storage medium having stored instructions that enable a machine to: operate a three-phase motor having a magnet with a number of pole-pairs and detecting zero crossings from a magnetic field sensing element proximate the magnet, wherein the zero crossings correspond to pole transitions for of the pole-pairs; determine drive angles corresponding to each of the zero crossings; determine a reference angle from the drive angles; sequentially position the motor to correspond to each one of the pole transitions and setting a drive angle to the reference angle; examine a signal generated from the magnetic field sensing element for each of the pole transitions; adjust a compensation level for the magnetic field sensing element for each of the pole transitions based on the signal generated from the magnetic field sensing element for the respective pole transitions; and operate the motor and applying the compensation level for each of the pole transitions as the corresponding pole transition is proximate the magnetic field sensing element.

The article can further include instructions for one or more of the following features: the magnetic field sensing element comprises a Hall element, examine the signal from the magnetic field sensing element using a three state comparator, the magnetic field sensing element comprises a Hall element, the compensation level for each of the pole transitions corresponds to an error in positioning of the magnetic field sensing element, rotate the motor in clockwise and counterclockwise directions to reduce hysteresis error, the zero crossings correspond to S to N pole transitions, take an average of the driving angles to determine the reference angle, use coarse and fine searching to determine the reference angle, and/or store for each pole-pair transition a zero crossing angle, a reference angle, an error value, and a compensation value.

BRIEF DESCRIPTION OF THE DRAWINGS

The foregoing features of this invention, as well as the invention itself, may be more fully understood from the following description of the drawings in which:

FIG. 7 is an example tabular representation of pole-pair error values and error compensation values;

FIG. 7A is a waveform diagram showing an error compensation signal and motor current;

FIG. 7B is a waveform diagram showing motor current with distortions from a sinusoidal waveform for a prior art motor controller.

DETAILED DESCRIPTION

Figure 1:
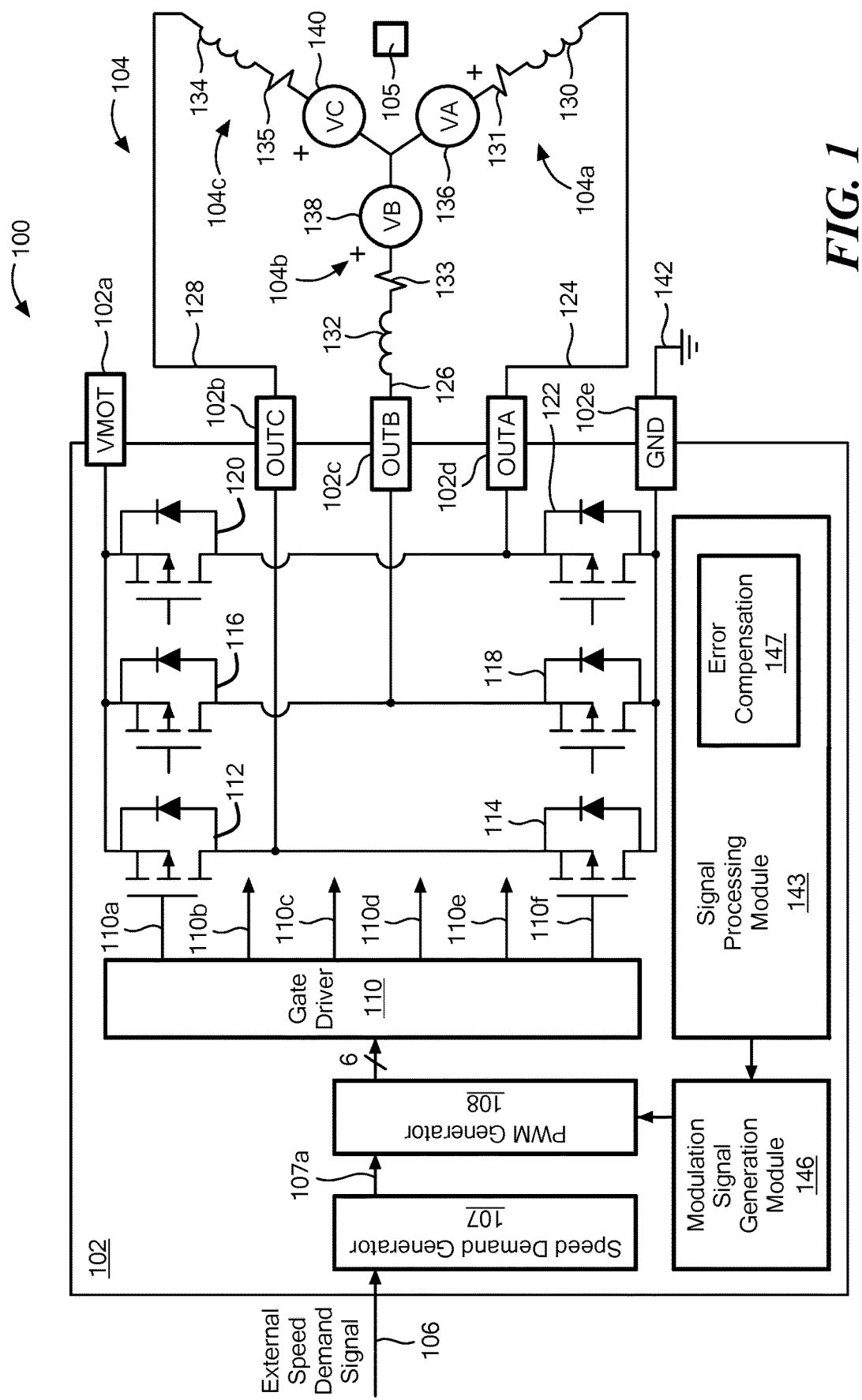
FIG. 1 is a schematic representation of a motor controller having error compensation.

FIG. 1 shows an example motor control circuit 102 coupled to an electric motor 104 for providing magnetic field sensing element error compensation in accordance with example embodiments of the invention. In embodiments, errors corresponding to a magnetic sensing element 105, which can comprise a Hall element, are compensated for to enhance operational efficiency and acoustic performance of the overall system. Error compensation can include, for example, sensors not installed in a precise position, magnetic fields not perfectly symmetric from pole to pole, motor windings not perfectly symmetric between the phases, and the like.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes a speed demand generator 107 coupled to receive an external speed demand signal 106 from outside of the motor control circuit 102. The external speed demand signal 106 can be in one of a variety of formats. In general the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals having a duty cycle that is controlled by the speed demand signal 107a. The PWM generator 108 is also coupled to receive modulation waveforms from a modulation signal generation module 146. The PWM signals are generated with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals.

The motor control circuit 102 can also include a signal processing module 143 and error compensation module 147 receiving feedback from the magnetic field sensing element (e.g., Hall sensor) 105. As described more fully below, errors can be identified and compensated for, such as by adjusting an offset of the Hall element.

The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
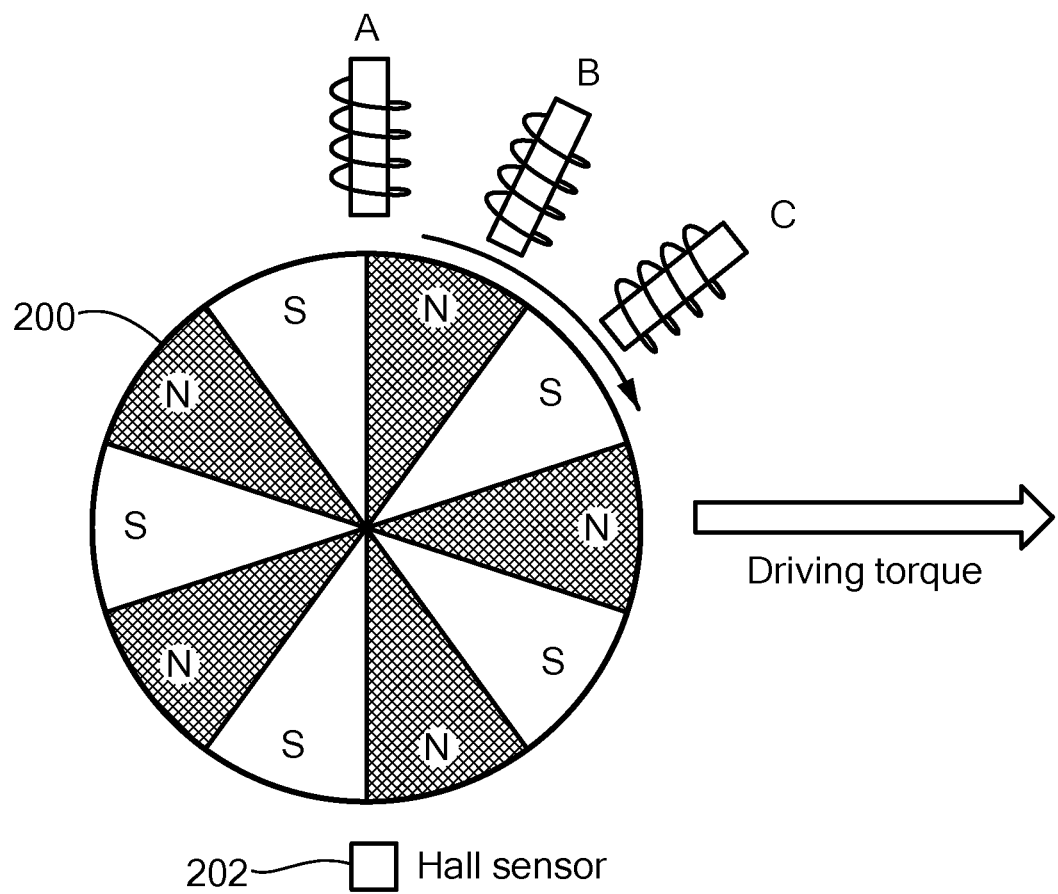
FIG. 2 is a schematic representation of a portion of motor control system including a magnetic sensing element.

FIG. 2 shows an illustrative embodiment of a magnet 200 of a three-phase motor in relation to phase A, phase B, and phase C with a Hall sensor 202 positioned at a particular position with respect to the phase A, B and C windings. The magnet 200 has a number of pole pairs shown as five pole pairs in the illustrated embodiment. There are number of pole transitions N-S and S-N as magnet rotates with respect to the Hall sensor 202.

It is understood that for a five-pole-pair motor, one mechanical cycle represents five electrical cycles, and one mechanical degree represents five electrical degrees. In the following description, unless specified, electrical cycle and electrical degree are used.

In a first mode, the motor is driven in a clockwise direction, as shown by the arrow, for positioning the motor. The motor is slowly rotated in one direction for one mechanical cycle (five electrical cycles), which corresponds to five electrical cycles in the illustrated embodiment. During the rotation, the zero crossing from S pole to N pole for the Hall sensor 202 occurs five times, once for each pole pair. In the illustrated embodiment, the Hall sensor 202 is located at a first one of the S-N pole transitions. The five driving angles for each of the S-N pole transitions are recorded at the time the Hall sensor information crosses zero. The five driving angles can be used to derive a reference angle. In embodiments, the average of the five angles is averaged to generate a reference angle for the Hall sensor. As will be described further below, the reference angle can be used for error compensation of Hall sensor for each pole-pair.

It is understood that the driving angles can be combined in any practical way to meet the needs of particular application. It is understood that one or more values may be removed including with the use of suitable criteria. In embodiments, magnet rotation can be rotated in any practical combination of clockwise and counterclockwise. In embodiments, any combination of S-N and N-S pole transitions can be used to meet the needs of a particular application. In embodiments, a Hall sensor can move in relation to the magnet.

As can be seen in the illustrated embodiment for a given time, as the motor slowly rotates clockwise, the Hall sensor 202 experiences a rising edge (S pole to N pole), and the driving angle (electrical angle) is 0 degrees.

In an embodiment, the five driving angles for the S pole to N pole edges should be relatively close to each other and around zero degrees. Example angles can be found as:
 0 degrees
 3 degrees
 358 degrees
 5 degrees
 359 degrees
The average of the angles can be computed by:

(0+3−2+5−1)/5=1

The 1 degree can be taken as the reference angle for the Hall sensor.

It is understood that the magnet can comprise any practical number of pole-pairs to meet the needs of a particular application. It is further understood that the average reference degree amount can be any position from 0 to 360 degrees, depending on Hall sensor installation.

Figure 3:
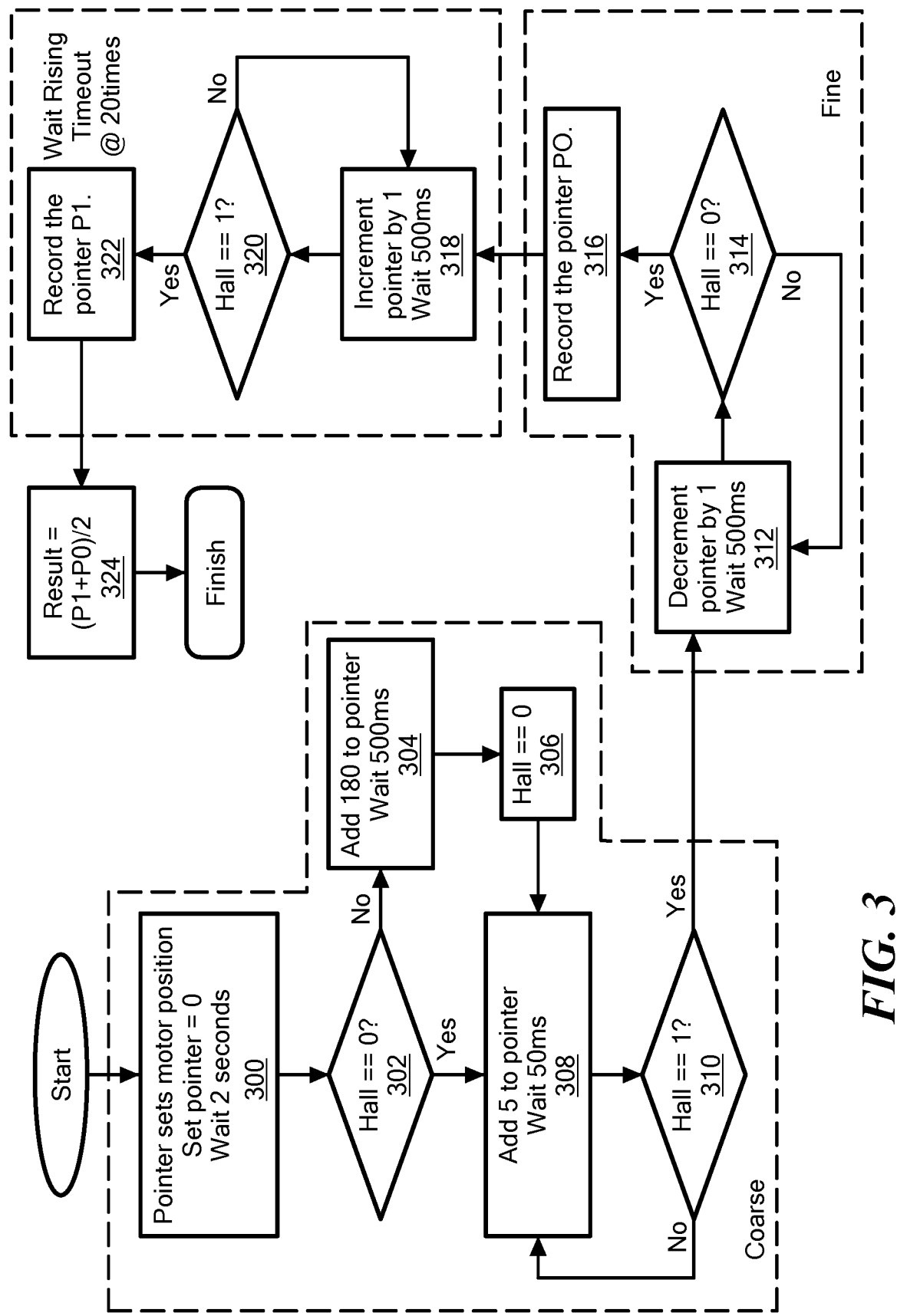
FIG. 3 is a flow diagram showing illustrative steps for determining a reference angle as part of an error compensation process.

FIG. 3 shows an example sequence of steps for determining a reference angle for the Hall sensor that can be understood in conjunction with a five pole-pair magnet and Hall sensor in FIG. 2, which shows one group of 3 phase windings, there are other 4 groups (12 windings) of windings (not shown) in the stator around the circle. In embodiments, the motor is positioned by driving the three phases with respective predetermined currents, which generate a current vector. The rotor is positioned to the vector direction which corresponds to the driving angle. In the illustrated embodiment, an N-pole of the rotor is positioned at the 3 o'clock position (horizontally to the right), which corresponds to a zero degree driving angle for a S-N pole transition at the Hall sensor. In the illustrated embodiment, the driving angle increases for clockwise rotation and decreases for counter clockwise rotation.

It should be noted that in the illustrative embodiment of FIG. 3 optional coarse searching and fine searching accelerate processing. In other embodiments, a reference angle can be found without coarse and fine searching. It should be further noted that for each pole transition of interest the motor may be driven back and forth to remove hysteresis error.

At step 300, a pointer sets the motor position to an angle of zero degrees. After a time to let the motor settle in position, such as two seconds, in step 302, it is determined whether the output of the Hall comparator (see FIG. 4) is zero. If not, rotating the motor by half electrical cycle (180 degree) in step 304 will result in a Hall comparator output zero. The motor is rotated 180 degrees and after some amount of time, such as 500 ms, the output will be zero in step 306.

In step 308, the motor position is moved 5 degrees clockwise and in step 310, it is determined whether the Hall comparator output is ONE. If not, going back to step 308, the motor moves another 5 degrees, until a Hall comparator output of ONE is found. If Hall output ONE is found, in step 312, the motor is moved counterclockwise by one degree, for example, and in step 314 it is determined whether the Hall comparator output is ZERO. If not, the motor is moved again in step 312 and the Hall comparator output is again checked for a ZERO in step 314. If the output is ZERO, a first pointer P0 value is recorded. In step 318, the motor is moved clockwise by incrementing the pointer by one degree, for example. In step 320, the Hall output comparator value is checked for a value of ONE. If not, the motor is moved again by incrementing the pointer by one in step 318 and the Hall comparator output checked again for a ONE in step 320. If the Hall comparator output is ONE, a second pointer value P1 is recorded. In step 324, the pointer values P0, P1 are averaged. With this arrangement, the zero crossing is evaluated from clockwise and counterclockwise motor rotation to reduce hysteresis error.

Figure 4:
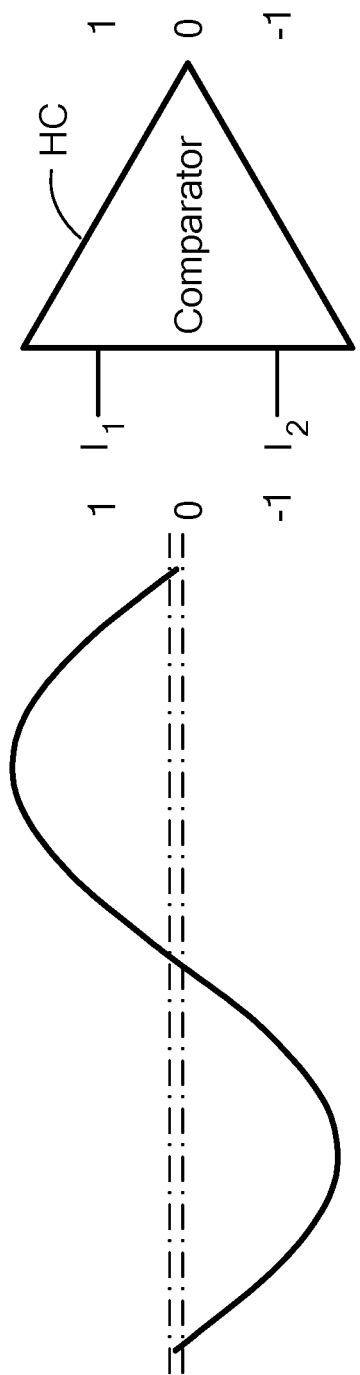
FIG. 4 is a schematic diagram of a comparator to receive differential signals from a magnetic field sensing element and generate an output based on the received signals.

In other embodiments, a Hall comparator output can be evaluated for a −1 value (see FIG. 4). It is understood that any granularity of motor positioning, such as less than one degree, can be used to meet the needs of a particular application. Rotation and counter motor rotation can occur to establish the location of a zero output of the Hall comparator to a desired level of resolution. As noted above, the range of inputs that define a zero output of the Hall comparator can also be adjusted to meet the needs of a particular application.

After a reference angle for the Hall sensor is determined, as described above, compensation for the pole-pairs can be determined by adjusting the offset of a Hall comparator HC, as described below.

FIG. 4 shows an example embodiment of a Hall comparator HC comprising a 3-state comparator for adjusting the compensation level. The Hall element outputs a differential signal which is provided to the Hall comparator HC as first input I1 and second input I2. If I1 is higher than I2, then the output of the Hall comparator HC is a 1. If I1 is lower than I2, then the output is −1. If the I1 and I2 are relatively close (e.g., the difference between inputs I1, I2 will affect the Hall position less than 1 degree), then the Hall comparator output is 0.

In embodiments, the Hall comparator HC includes an adjustable offset which shifts the input zero crossing level. That is, the magnitude of the difference between inputs I1 and I2 that result in a Hall comparator output of 0 can be adjusted.

Figure 5:
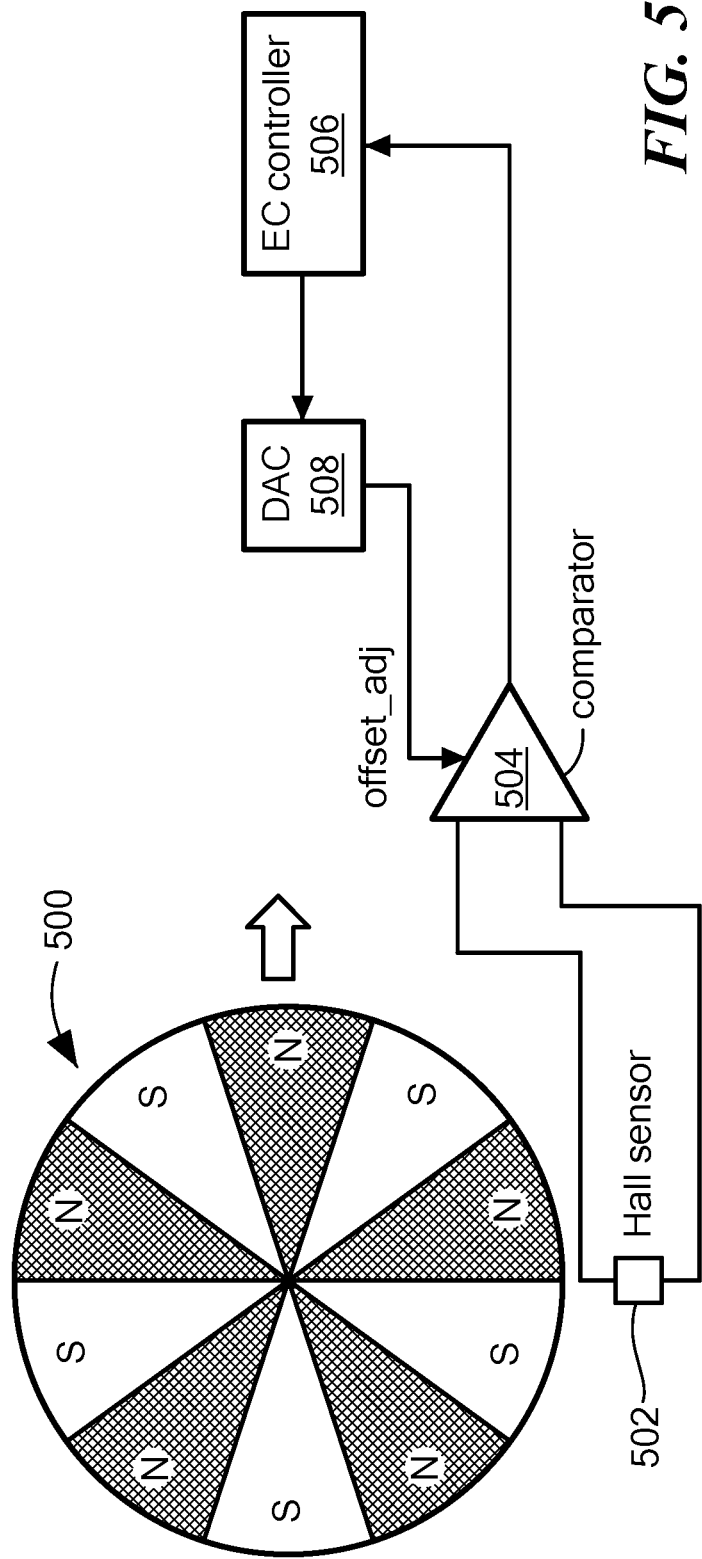
FIG. 5 is a schematic representation of a portion of a motor controller to adjust error compensation levels.

FIG. 5 shows a magnet having five pole pairs with a Hall sensor positioned near the magnet. The differential Hall outputs are provided to a Hall comparator 504 the output of which is provided to an error compensation controller 506, which can form a part of the error compensation module 147 of FIG. 1. The output of the error compensation controller 506 is provided to a digital-to-analog (DAC) module 508 which provides the offset adjustment to the Hall comparator

504. As noted above, the offset adjustment determines when a difference between the differential Hall outputs generates a zero output by the Hall comparator 504.

To continue the error compensation example, the motor is positioned at the first pole pair and the driving angle is set to 1 degree, which was calculated as described above. The outputs of the Hall sensor 502 are provided to the comparator 504. While the S-N transition is aligned with the Hall sensor 502, as shown, the output of the comparator 504 is expected to be zero. In the example, due to Hall sensor error, assume the comparator 504 output is not zero. The EC controller 506 controls the DAC 508 to adjust the offset to the Hall comparator 504 until the comparator output becomes zero. This is repeated for each pole pair. The motor can then be run with Hall sensor error compensation by controlling the comparator offset adjustment to provide enhanced operational characteristics, such as stabilized motor current, improved efficiency, and reduced acoustic noise.

Figure 6:
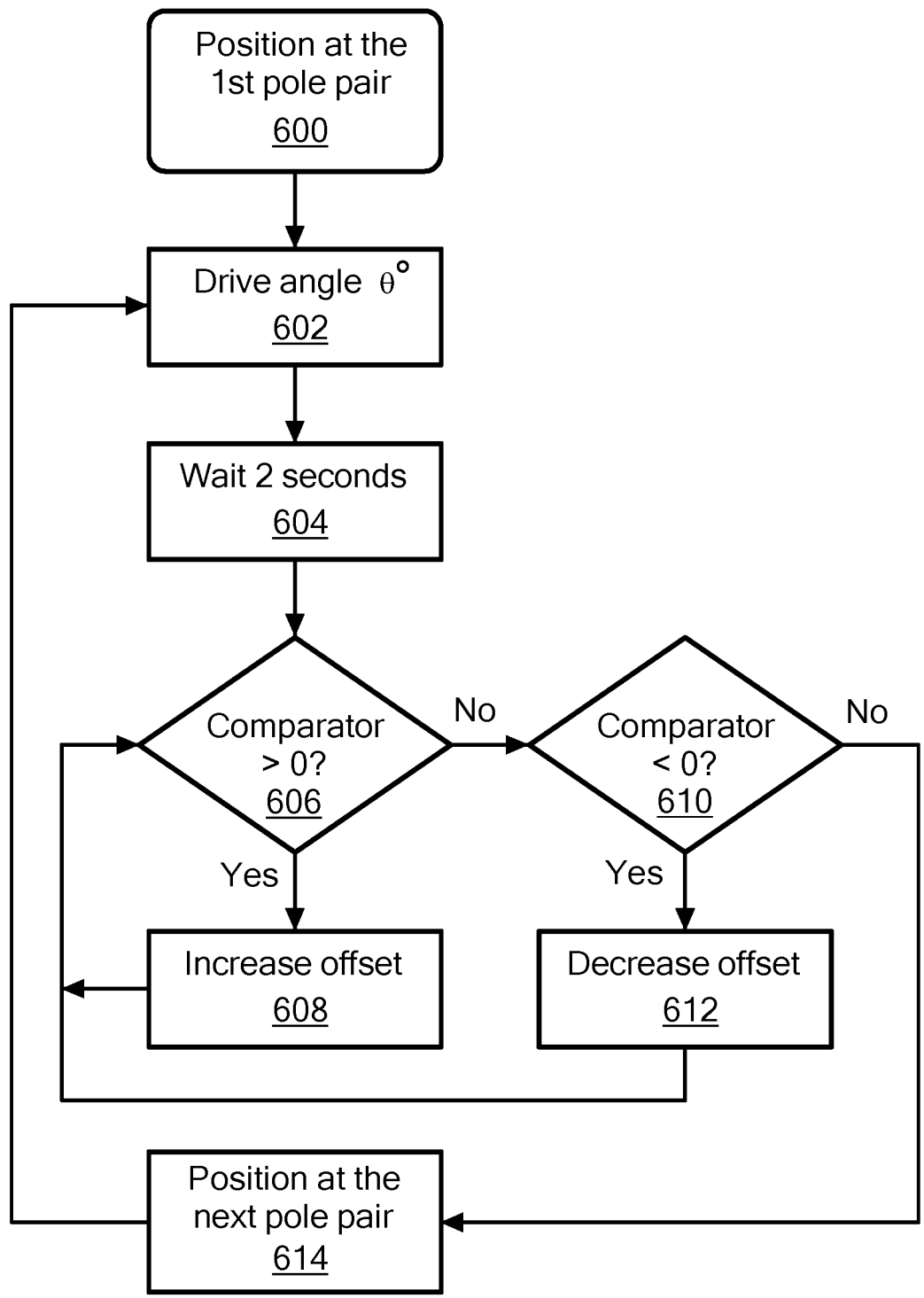
FIG. 6 is a flow diagram showing illustrative steps for adjusting error compensation levels.

FIG. 6 shows an illustrative implementation of determining pole-pair offset adjustment for the comparator. In, step 600, the motor is positioned at a first one of the magnet pole pairs. Using the previously determined reference angle, in step 602, the motor is moved to that reference angle. In the example above, the reference angle was determined to be 1 degree. In step 604, for some period of time, such as two seconds, the system waits for the motor to stop. In step 606, it is determined whether the Hall comparator output is greater than zero. If so, in step 608, the offset to the Hall comparator is increased and the comparator output is evaluated again in step 606. When the comparator output is found not to be greater than zero, in step 610, it is determined whether the comparator output is less than zero, e.g., −1. If so, in step 612, the offset to the Hall comparator is increased by the EC controller 506, for example, and processing continues in step 606. If not, where the comparator output is zero, in step 614, the motor is positioned at the next pole pair and processing continues at step 602 for that pole pair. Processing continues until an offset compensation value for each pole-pair is determined.

It is understood that the Hall comparator, and other components and modules, can be implemented in any practical hardware, software, processors, or combination thereof, that will be apparent to one of ordinary skill in the above.

FIG. 7 shows a table listing for each pole-pair example values for a zero cross angle, a reference angle, a Hall error, as computed above, and a corresponding error compensation value that can be provided as an offset adjustment to the comparator (see 504 FIG. 5). In the illustrative embodiment, the zero crossing angles correspond to the above example, and the reference is one for each pole pair, as computed in the above example. The first pole pair is determined to have an error of −1 and an error compensation value of 2. A second pole-pair, which has a zero crossing angle of 3, is determined to have an error value of 2, which corresponds to an error compensation value of −4, and so on.

FIG. 7A shows an offset adjustment signal (e.g., offset_adj in FIG. 5) to the Hall comparator that provides error compensation shown in the table of FIG. 7. As can be seen, the motor current MC is a sinusoidal waveform with distortions reduced by Hall sensor error compensation as compared with conventional systems. FIG. 7B shows a conventional motor current waveform without Hall sensor error compensation with distortions as compared with the waveform of FIG. 7A.

While illustrative embodiments of the invention are shown and described in conjunction with a magnetic field sensing element comprising a Hall element, it is understood that any suitable type of magnetic field sensing element can be used.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 8:
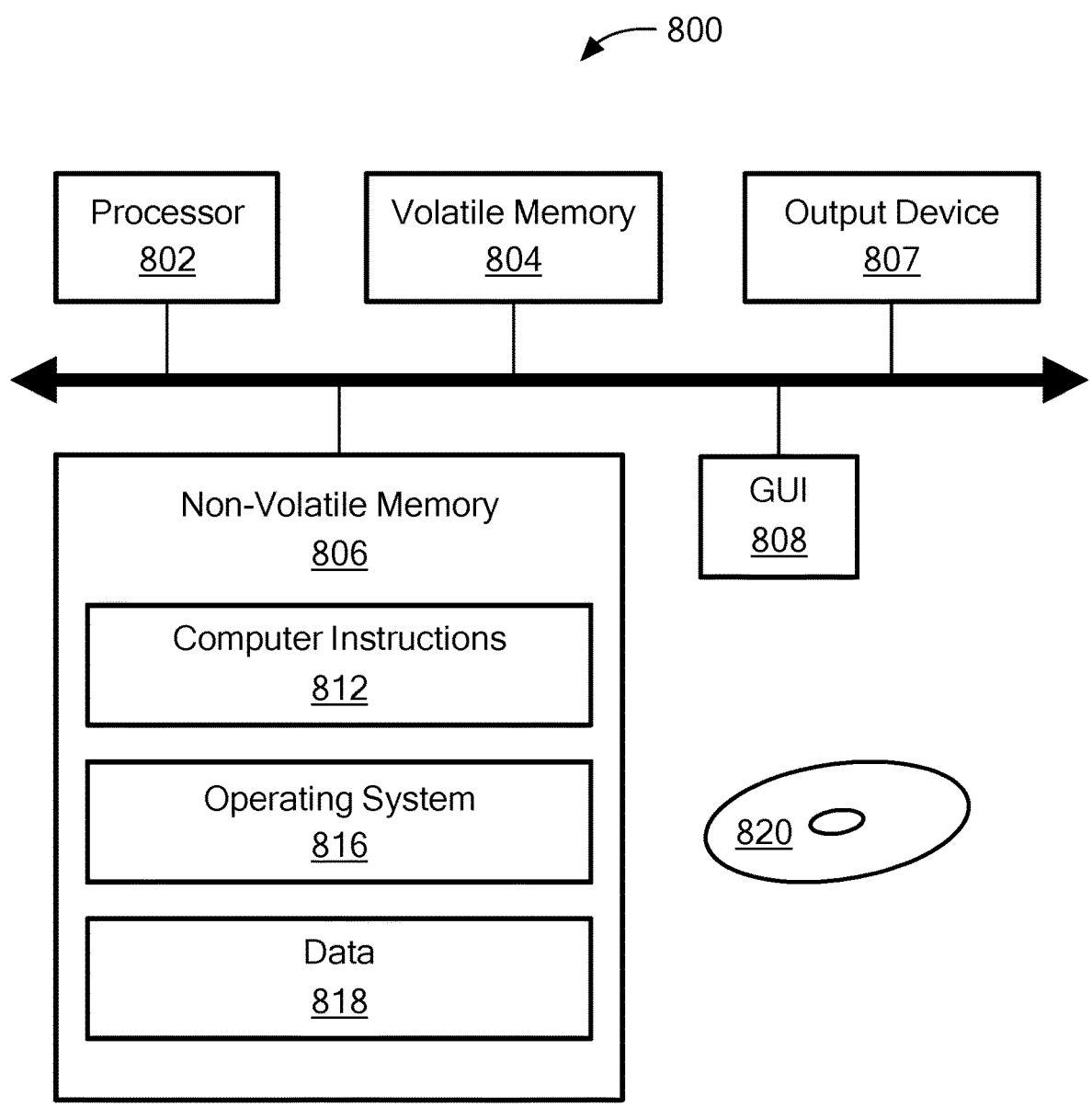
FIG. 8 is a schematic representation of an illustrative computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
operating a three-phase motor having a magnet with a number of pole-pairs and detecting zero crossings from a magnetic field sensing element proximate the magnet, wherein the zero crossings correspond to pole transitions for the pole-pairs;
determining drive angles corresponding to each of the zero crossings;
determining a reference angle from the drive angles;
sequentially positioning the motor to correspond to each one of the pole transitions and setting a drive angle to the reference angle;
examining a signal generated from the magnetic field sensing element for each of the pole transitions;
adjusting a compensation level for the magnetic field sensing element for each of the pole transitions based on the signal generated from the magnetic field sensing element for the respective pole transitions; and
operating the motor and applying the compensation level for each of the pole transitions as the corresponding pole transition is proximate the magnetic field sensing element.

2. The method according to claim 1, further including providing the magnetic field sensing element as a magnetoresistive element.

3. The method according to claim 1, further including examining the signal from the magnetic field sensing element using a three state comparator.

4. The method according to claim 1, wherein the magnetic field sensing element generates a differential output.

5. The method according to claim 1, wherein compensation level for each of the pole transitions corresponds to an error in positioning of the magnetic field sensing element.

6. The method according to claim 1, further including rotating the motor in clockwise and counterclockwise directions to reduce hysteresis error.

7. The method according to claim 1, wherein the zero crossings correspond to S to N pole transitions.

8. The method according to claim 1, further including taking an average of the driving angles to determine the reference angle.

9. The method according to claim 1, further including using coarse and fine searching to determine the reference angle.

10. The method according to claim 1, further including storing for each pole-pair transition a zero crossing angle, the reference angle, an error value, and a compensation value.

11. A system comprising:
a motor controller for a three phase motor comprising:
a means for error compensation to operate the three-phase motor having a magnet with a number of pole-pairs and detecting zero crossings from a magnetic field sensing element proximate the magnet, wherein the zero crossings correspond to pole transitions for the pole-pairs, to determine drive angles corresponding to each of the zero crossings, to determine a reference angle from the drive angles, to sequentially position the motor to correspond to each one of the pole transitions and setting a drive angle to the reference angle, to examining a signal generated from the magnetic field sensing element for each of the pole transitions; to adjust a compensation level for the magnetic field sensing element for each of the pole transitions based on the signal generated from the magnetic field sensing element for the respective pole transitions; and to operate the motor and applying the compensation level for each of the pole transitions as the corresponding pole transition is proximate the magnetic field sensing element.

12. The system according to claim 11, wherein the magnetic field sensing element comprises a magnetoresistive element.

13. The system according to claim 11, wherein the means for error compensation is further configured to examine the signal from the magnetic field sensing element using a three state comparator.

14. The system according to claim 12, wherein the magnetic field sensing element generates a differential output.

15. The system according to claim 11, wherein compensation level for each of the pole transitions corresponds to an error in positioning of the magnetic field sensing element.

16. The system according to claim 11, wherein the means for error compensation is further configured to rotate the motor in clockwise and counterclockwise directions to reduce hysteresis error.

17. The system according to claim 11, wherein the zero crossings correspond to S to N pole transitions.

18. The system according to claim 11, wherein the means for error compensation is further configured to take an average of the driving angles to determine the reference angle.

19. The system according to claim 11, wherein the means for error compensation is further configured to use coarse and fine searching to determine the reference angle.

20. An article, comprising:
a non-transitory storage medium having stored instructions that enable a machine to:
operate a three-phase motor having a magnet with a number of pole-pairs and detecting zero crossings from a magnetic field sensing element proximate the magnet, wherein the zero crossings correspond to pole transitions for of the pole-pairs;
determine drive angles corresponding to each of the zero crossings;
determine a reference angle from the drive angles;
sequentially position the motor to correspond to each one of the pole transitions and setting a drive angle to the reference angle;
examine a signal generated from the magnetic field sensing element for each of the pole transitions;
adjust a compensation level for the magnetic field sensing element for each of the pole transitions based on the signal generated from the magnetic field sensing element for the respective pole transitions; and
operate the motor and applying the compensation level for each of the pole transitions as the corresponding pole transition is proximate the magnetic field sensing element.

21. The article according to claim 20, wherein the magnetic field sensing element comprises a magnetoresistive element.

22. The article according to claim 20, further including instructions to examine the signal from the magnetic field sensing element using a three state comparator.

23. The article according to claim 20, wherein compensation level for each of the pole transitions corresponds to an error in positioning of the magnetic field sensing element.

24. The article according to claim 20, further including instructions to use coarse and fine searching to determine the reference angle.

* * * * *